Figure 1:
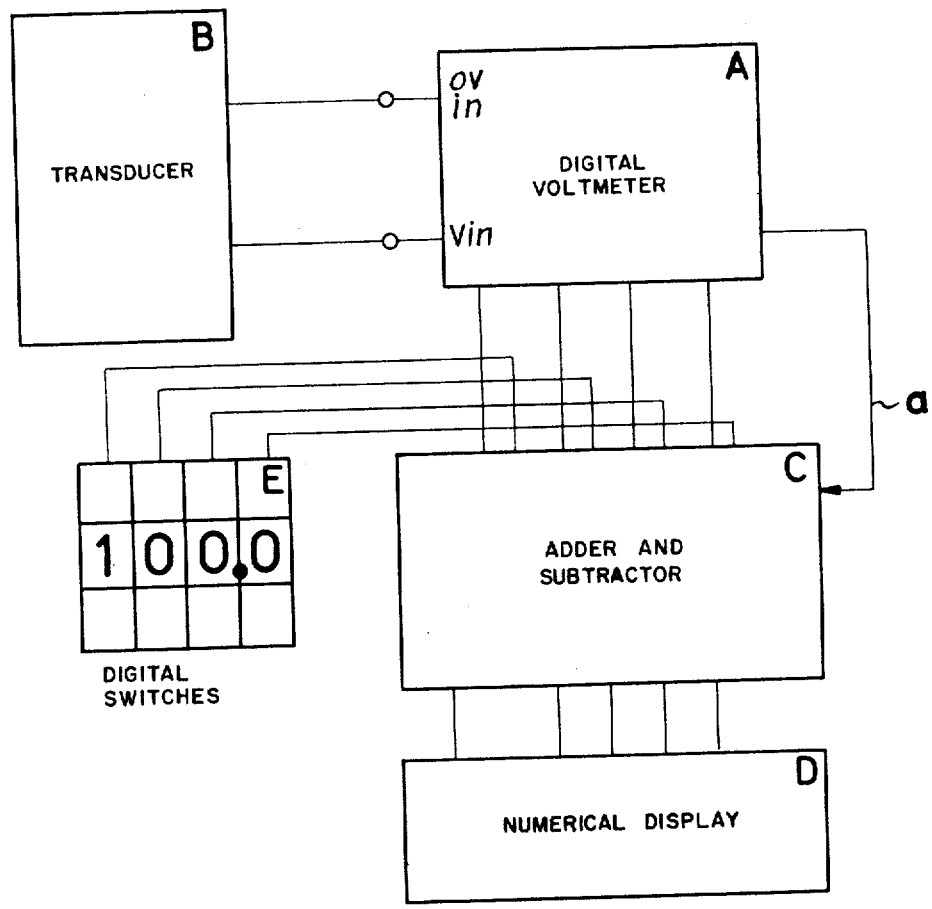

United States Patent
Widmer

[11] 3,889,540
[45] June 17, 1975

[54] APPARATUS FOR CONTROLLING THE FEELER DISPLACEMENT OF AN ELECTRONIC DIMENSIONAL

[75] Inventor: Werner Widmer, Chatelaine-Geneva, Switzerland

[73] Assignee: Societe Genevoise d'Instruments de Physique, Geneva, Switzerland

[22] Filed: Mar. 5, 1973

[21] Appl. No.: 337,908

[30] Foreign Application Priority Data
Apr. 6, 1972  Switzerland.................... 5081/72

[52] U.S. Cl. .......................... 73/432 A; 33/172 E
[51] Int. Cl.² ........................................ G01B 3/00
[58] Field of Search..... 73/432 A, 432 R; 33/172 E, 33/172 R, 134 A, DIG. 13, 174 L, 143 L, 148 H; 235/151.3, 151.32; 177/225, 226

[56] References Cited
UNITED STATES PATENTS 1,138,687   5/1915   Reichman ................... 177/226
2,588,322   3/1952   Herbst ........................ 177/225
3,742,610   7/1973   Calame ....................... 33/172 R FOREIGN PATENTS OR APPLICATIONS
516,789   1/1972   Switzerland Primary Examiner—S. Clement Swisher
Assistant Examiner—Denis E. Corr
Attorney, Agent, or Firm—Young & Thompson

[57] ABSTRACT

An improvement in electronic dimensional sensors using feelers, comprises means for automatically adding to or subtracting from the micro-indicator display of the sensor a pre-set feeler displacement value corresponding to a chosen measuring force, thus avoiding the need to take unavoidable feeler displacements into account when calculating the measured dimension. To be able to measure in both directions with the sensor there is further provided with a device for detecting the sign of the measurement in order to decide in which terms the value measured has to be modified before being displayed.

2 Claims, 5 Drawing Figures

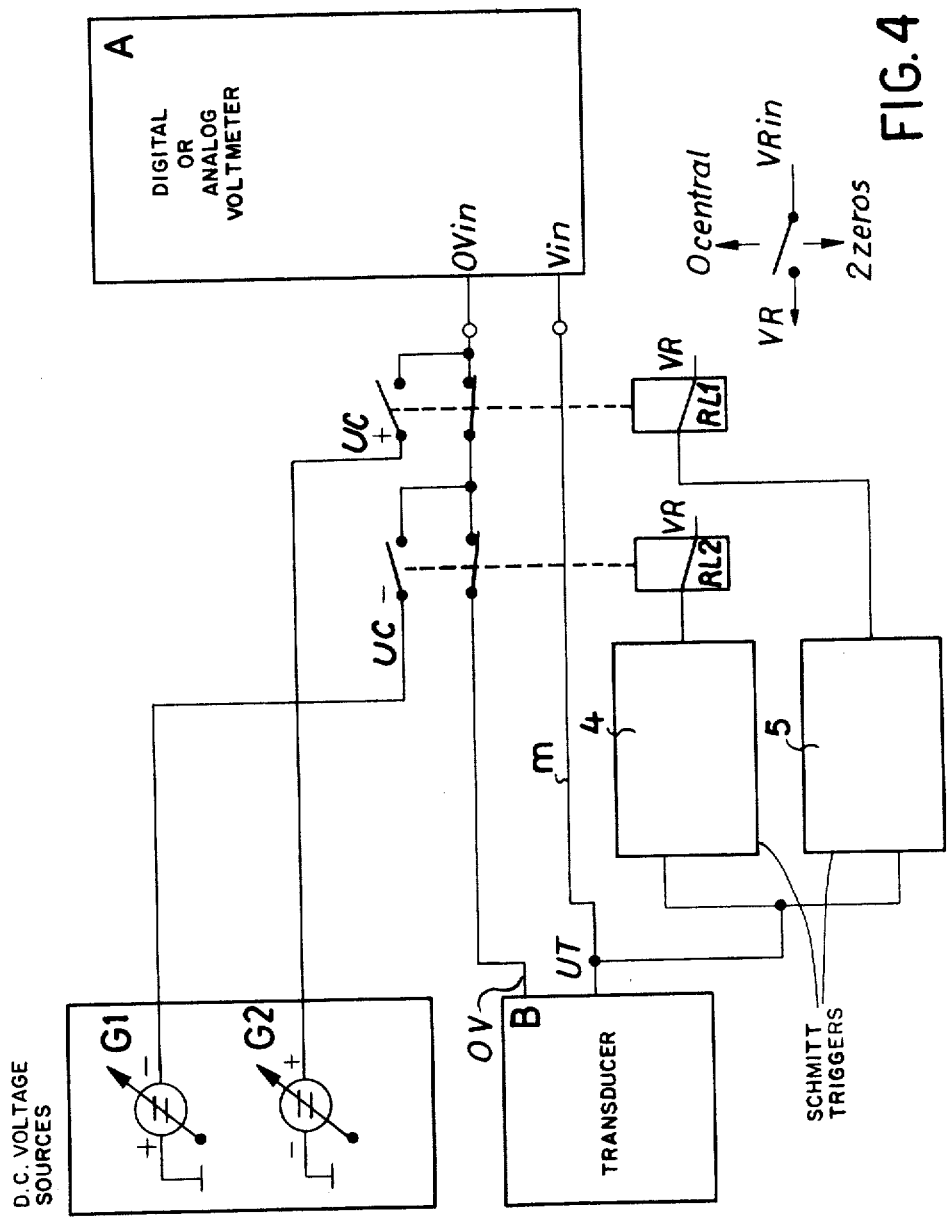

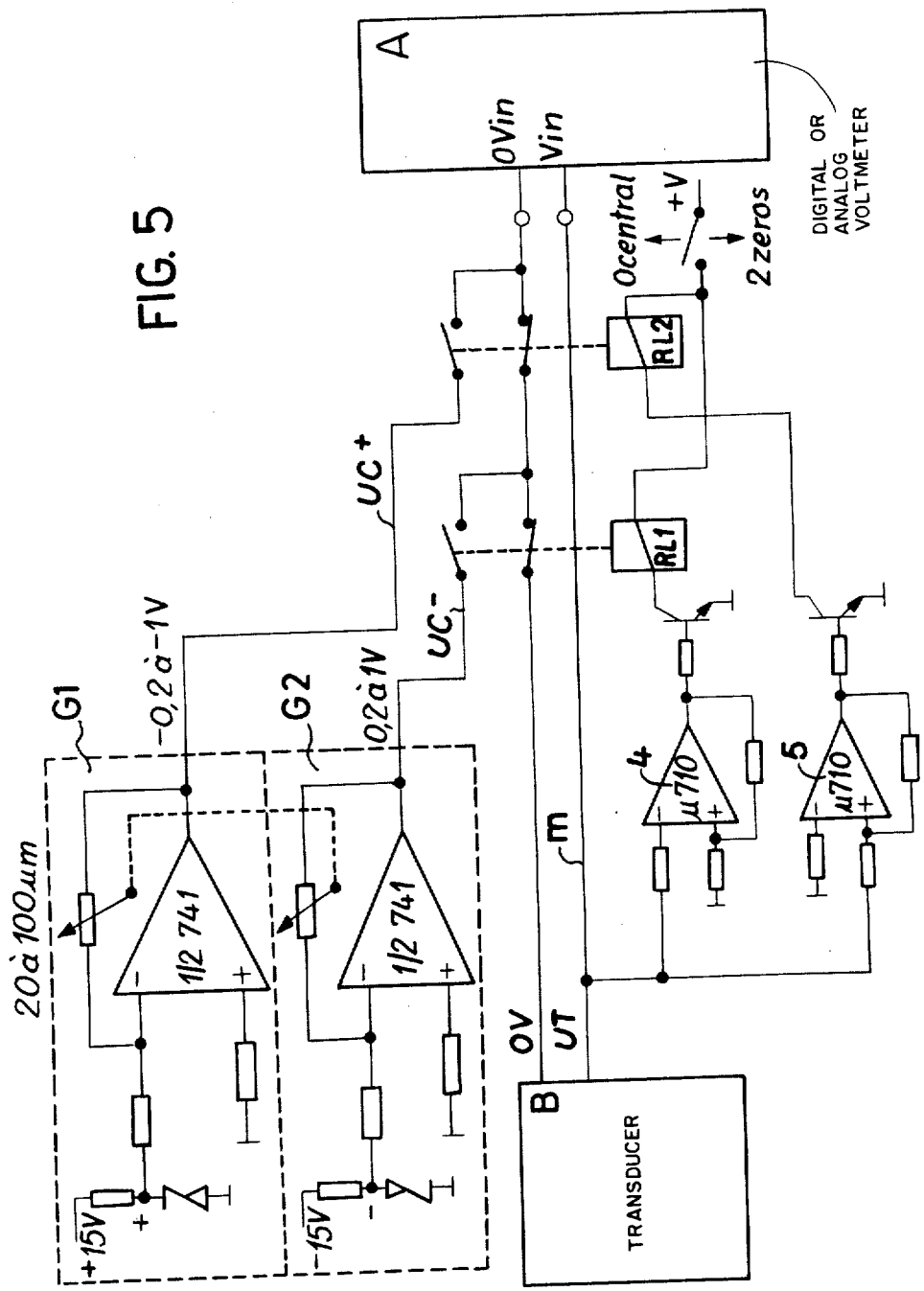

_3,889,540_

APPARATUS FOR CONTROLLING THE FEELER DISPLACEMENT OF AN ELECTRONIC DIMENSIONAL

For dimensional measurements using a feeler, the contact force between the feeler and the object to be measured must always be different from zero. Thus electronic micro-indicators have been equipped with sensors for measuring an axial or lateral displacement or a displacement along two co-ordinates against a resilient return action. The sensors may be positioned so that the length measurement, for example, is performed with a specific force. Obviously this measuring force must always be the same, in order to ensure that the measurement can be repeated and it must always be directed opposite the feeler displacement.

This setting of the measuring force can be achieved, for example, with an electronic transducer equipped with a mechanical sensor of the type described in U.S. Pat. No. . . . . 3,742,610 with a mechanical device or mounted on it to reverse the measuring force, if one is required to measure in both directions with one and the same sensor.

Such a mechanical device is always complex and not usually conducive to easy measurement.

Accordingly, it is an object of the present invention to provide means for altering the display of a microindicator showing displacements of a feeler, so that the above-mentioned drawbacks are avoided. Thus a preset feeler offset value corresponding to the desired measuring force may be automatically added to or subtracted from the total feeler displacement of the sensor.

Another object of the invention is an apparatus for carrying out the method described, which is characterised in that it comprises a device for adding or subtracting a value corresponding to the measuring pressure, and a device for detecting the sign of the measurement applied to the value measured by a micro-indicator of known type, before the value of the total feeler displacement plus or minus the pre-set feeler offset is displayed by a reading device.

Figure 2:
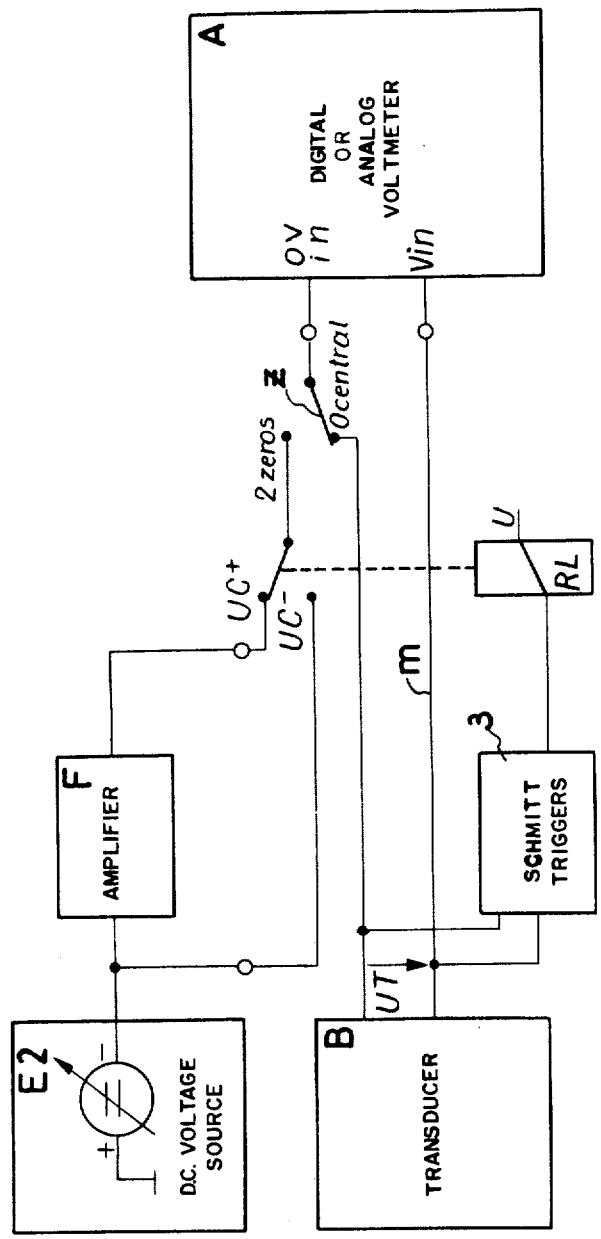
Figure 3:
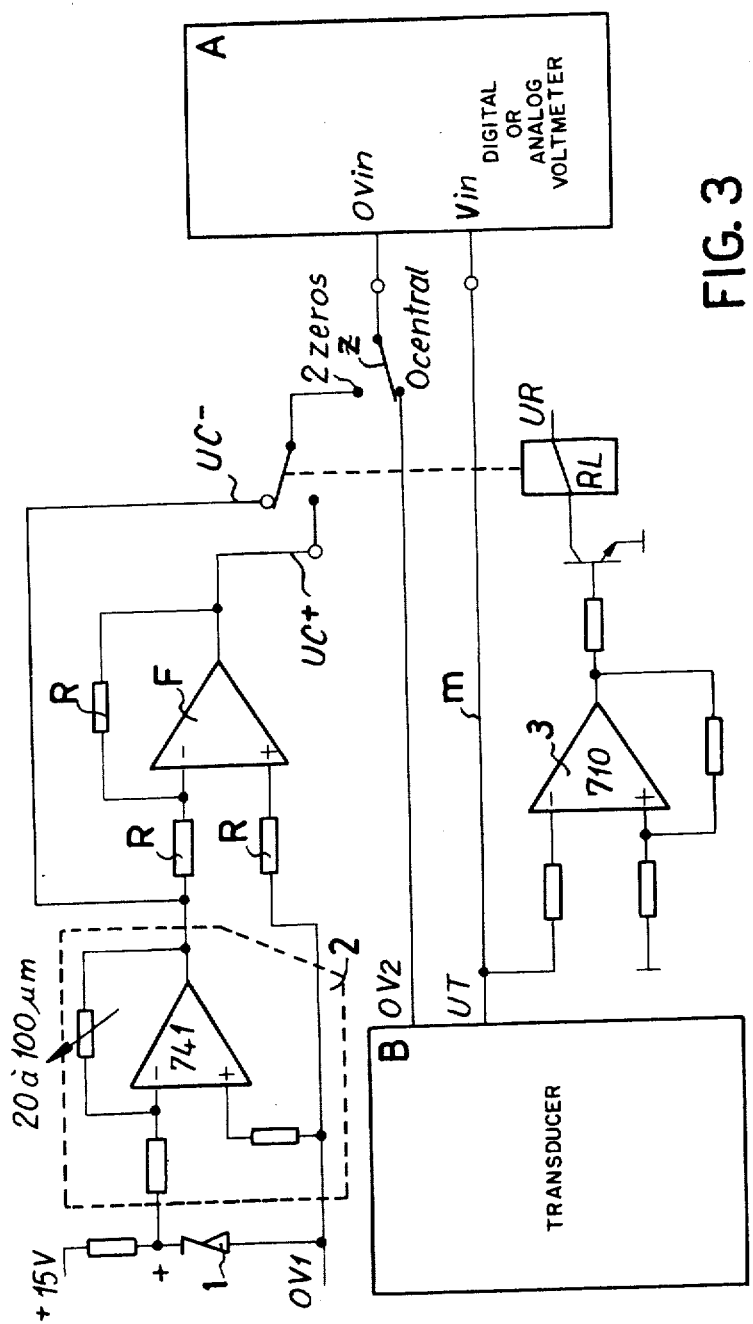

Three embodiments of the control apparatus according to the invention are illustrated diagrammatically and by way of example in the accompanying drawings, in which:

FIG. 1 is a block diagram of a first embodiment,
FIG. 2 is a block diagram of a second embodiment,
FIG. 3 is a diagram of an application of the second embodiment,
FIG. 4 is a block diagram of a third embodiment and
FIG. 5 is a diagram of an application of the third embodiment.

The present invention resolves the problem of controlling the feeler offset due to the measuring force and its reversal by electronic displacement of the zero in the reading in the positive or negative direction. The zero may be displaced by a digital or analogue method, and the value of the shift will correspond to the value of the measurement corresponding to the measuring force. The direction of the shift is determined by the sign of the measurement. The invention has the advantage of making the control of the feeler offset easy and accurate, free from the defects of mechanical devices (hysteresis and fatigue of the resilient elements). As for the offset reversal, this is achieved very simply by an electric signal which does not affect the position of the mechanical zero of the sensor. The present method is thus particularly advantageous for automatic measurement.

The apparatus will be illustrated and described in detail, on the assumption that the mechanical feeler and electronic transducer are known. A transducer of this type and its mechanical feeler may, for example, be constructed as indicated in Swiss Patent No. 516,789 or be made up of an electronic linear measuring instrument with an indicating transducer, such as the MESELTRON manufactured by Messrs. CARY of Le Locle.

In the first embodiment illustrated in FIG. 1, B is a transducer with an amplifier and means for setting the position of the zero point (position of the feeler when no force acts on it) such as a CARY-MESELTRON manufactured by Messrs. CARY of Le Locle; the measuring signal which it transmits is passed to a digital voltmeter A without display means and with one input terminal grounded. The digital voltmeter A (analogue-to-digital converter), with four digits BCD and a digital output without display may, for example, be a WESTON re-introduced by Schlumberger or a SCHNEIDER re-introduced by Memo A.G. The digital voltmeter A measures the analogue voltage supplied by B and representing the displacement of the feeler.

The output of the digital voltmeter feeds a display means D by way of a four-digit adder and subtracter C. The numerical display D is brought about, for example, by four integrated circuits SN7414IN (Texas), four display tubes of the Nixie type with numerals and a display tube of the Nixie type with signs (+ or −). The adder and subtracter C is of the type described in the article: "Decimal calculator" page 131, paragraph 5.4 and page 147 ref. 13 and 16 of the "Cahiers de la C.S.L.", April 1971. EPF2.

Thus the value of the measurement is corrected by the addition or subtraction of a magnitude before being displayed.

The magnitude (or zero-offset) to be added or subtracted must be the value of the feeler displacement corresponding to the desired measuring force. It is fed to the adder and subtracter C by four digital switches (Multi switch) type AO31 (Contraves S.A.) E.

Finally the addition or subtraction is controlled by the sign + or − of the signal $a$ supplied by the digital voltmeter A and corresponding to the sign of the measurement.

Thus the sign of the feeler displacement is automatically reversed as soon as the direction of the contact force is reversed and the feeler offset (and the measuring force, which is proportional to it) may easily be set, for example at +200 and −200 microns.

The result of the measurement is thus automatically corrected, before display, by numerically adding or subtracting the value corresponding to the displacement of the zero (or zero offset), which is proportional to the measuring force.

The second embodiment of the apparatus for controlling the feeler offset comprises a digital or analogue voltmeter A, of the same type as in the first embodiment except that the display means are not omitted. The voltmeter A is again fed by the measuring signal $m$ supplied by the transducer B, which may be of the same type as in the first embodiment.

The zero offset is set by applying a positive or negative voltage, of an amplitude corresponding to the desired measuring force, to the input terminal of the voltmeter A. Thus voltmeter A adds algebraically the two inputs: feeler displacement and the plus or minus zero offset which was grounded in the first embodiment.

The voltage $UC^+$ is obtained from a source of adjustable direct current voltage E2. This voltage source may, for example, comprise a voltage divider with a Zener diode 1 and a variable gain amplifier 2 (FIG. 3).

To obtain the voltage $UC^-$, an amplifier F with a gain of $-1$ is fed by the voltage $UC^+$ supplied by the voltage source 1, 2.

When the measuring voltage $m$ is positive the connection OVin of the voltmeter A must be brought to the voltage $UC^-$, whereas when the measuring voltage is negative the terminal OVin must be brought to the potential $UC^+$.

This is achieved by a relay RL controlled by a bistable Schmitt trigger 3 which changes state when the measuring voltage $m$ passes through zero.

The switch Z enables the input OVin of the voltmeter A to be connected either to the controllable voltage source E2 or to the transducer B to adjust the central zero, that is to say, without zero offset force.

The third embodiment, illustrated in FIGS. 4 and 5, is similar to the second but comprises two separate adjustable voltage sources $G_1$, $G_2$ to supply voltages $UC^-$ and $UC^+$.

Similarly two Schmitt triggers 4, 5 are used, respectively controlling the relay RL1 and the relay RL2; consequently the voltage $UC^-$ is connected to the input OVin of the voltmeter A when the measuring voltage is positive, and the voltage $m$ $UC^+$ is connected thereto when the measuring voltage $m$ is negative.

I claim:

1. In an electronic dimensional sensor having a displaceable feeler that bears against a surface to measure a dimension corresponding to the position of said surface, and a micro-indicator display of feeler displacement; the improvement comprising means for adding to or subtracting from the displayed displacement a value equal to the value of feeler displacement corresponding to a predetermined force between said feeler and said surface, and means to detect the sign of the measurement and to effect said addition or subtraction according to said sign, said adding or subtracting means comprising, connected to the output of a digital voltmeter, an adder and subtracter controlled both by the sign of the measurement and by control switches, said adder and subtracter feeding a numerical display means.

2. In an electronic dimensional sensor having a displaceable feeler that bears against a surface to measure a dimension corresponding to the position of said surface, and a micro-indicator display of feeler displacement; the improvement comprising means for adding to or subtracting from the displayed displacement a value equal to the value of feeler displacement corresponding to a predetermined force between said feeler and said surface, means to detect the sign of the measurement and to effect said addition or subtraction according to said sign, and at least one source of adjustable direct current voltage connected either to a neutral terminal of a digital or analog voltmeter or to an amplifier with a gain of at least one which is itself connected to said neutral terminal of the voltmeter, said detector means causing said terminal of the voltmeter to be switched over either to said voltage source or to the amplifier, according to whether the measuring signal is positive or negative.

* * * * *